June 30, 1964  R. S. POUNDS  3,138,911
HEDGE TRIMMER

Filed July 17, 1962  3 Sheets-Sheet 1

INVENTOR.
RUSSELL S. POUNDS
BY
Baldwin & Martin
ATTORNEYS

June 30, 1964 R. S. POUNDS 3,138,911
HEDGE TRIMMER
Filed July 17, 1962 3 Sheets-Sheet 2
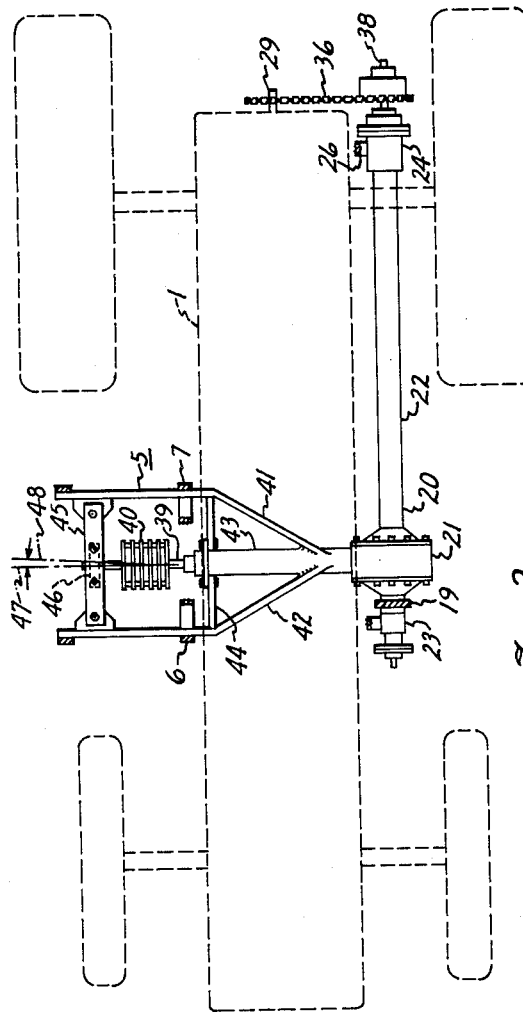
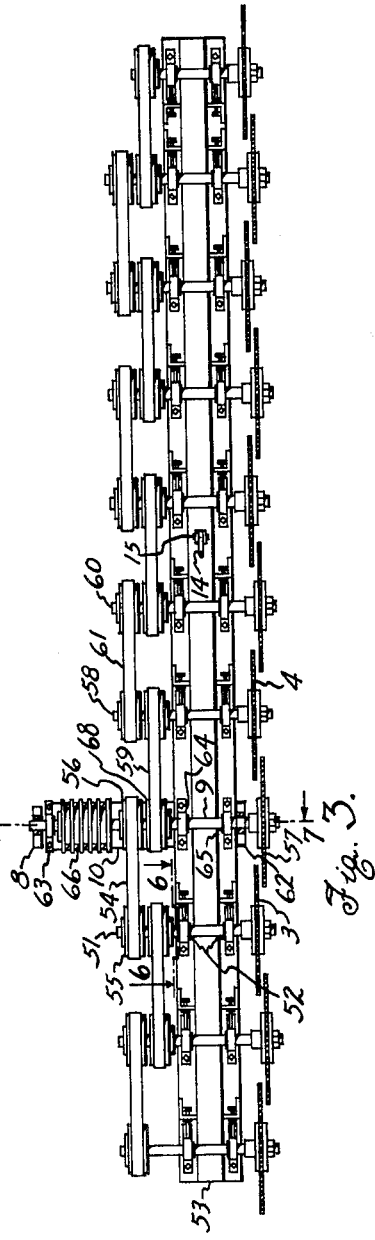
INVENTOR.
RUSSELL S. POUNDS
BY
ATTORNEYS

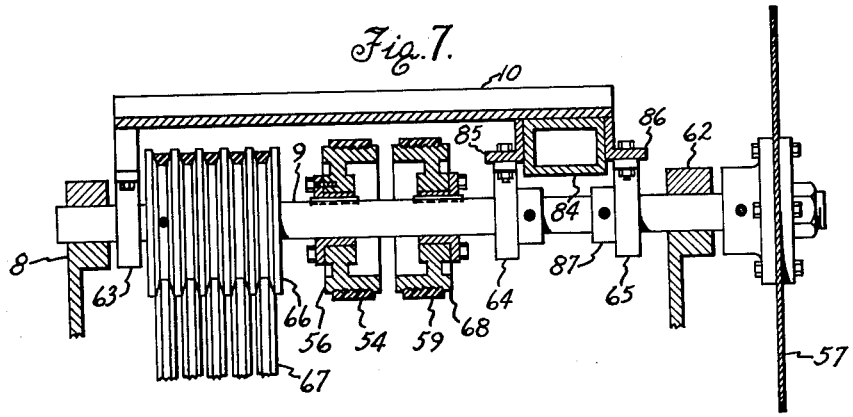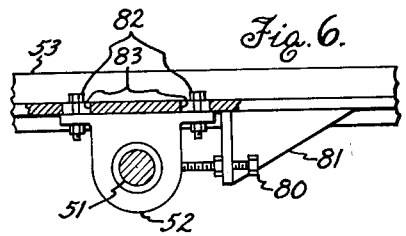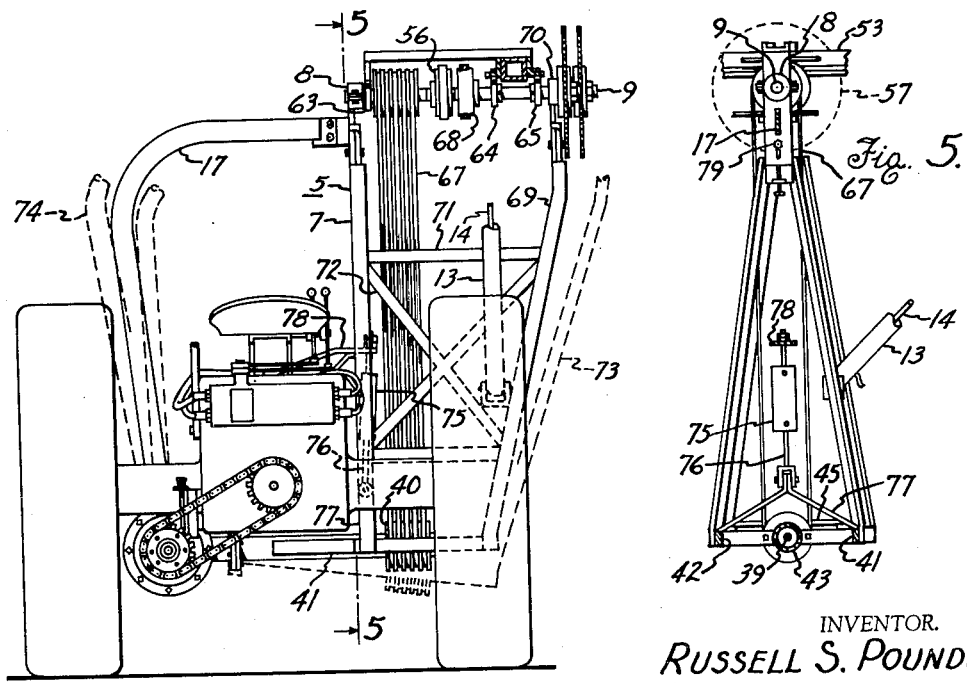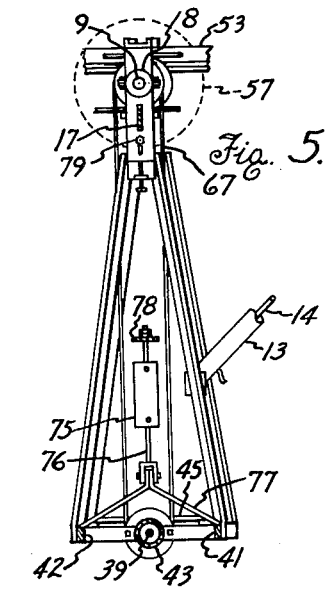

United States Patent Office 3,138,911
Patented June 30, 1964

3,138,911
HEDGE TRIMMER
Russell S. Pounds, P.O. Box 248, Winter Garden, Fla., assignor of one-half to James Herbert Pounds, Winter Garden, Fla.
Filed July 17, 1962, Ser. No. 210,495
5 Claims. (Cl. 56—235)

This invention relates to agricultural devices for attachment to tractors, and, particularly, to a hedge trimming machine for use in groves and orchards.

A general object of the invention is to provide an improved hedge trimmer.

A more specific object of the invention is to simplify, improve the mounting, control and drive arrangements of, decrease the power requirements of and increase the effectiveness of tractor mounted hedge trimmers and to particularly adapt trimmers for use in groves and orchards.

In citrus groves it is desired to maintain open paths between the rows of trees through which tractors, trucks and the like can pass for cultivation, fertilizing, spraying and otherwise caring for the trees, and for picking and gathering the fruit. Such paths also permit sunlight to reach the lower branches of the trees.

Various attempts have been made to provide trimmers satisfactory for use to perform this task, but the arrangements suggested have not been sufficiently powerful or sturdy, or have not been sufficiently maneuverable, or have required excessive manpower to operate, or have not been readily controllable to trim the trees at any desired adjustable upright angle in a straight line down the path. It is desired, furthermore, that the operator have more ready and convenient control of the positions of the cutters than heretofore provided to permit changing of the angle of the cutter arm at any time.

It is, accordingly, within the objects of this invention to embody the above outlined desirable features in a trimmer.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIGURE 2 is a sectional view taken along line 2—2 of FIGURE 1 showing portions of the trimmer attachment disposed in proper relation to the tractor, the tractor being represented in phantom;

FIGURE 3 is a view of the underside of the cutter arm assembly of the machine.

FIGURE 4 is a rear elevation of the complete machine, a portion of the cutter arm assembly being shown in section;

FIGURE 5 is a sectional view taken along line 5—5 of FIGURE 4.

FIGURE 6 is a detail sectional view taken along line 6—6 of FIGURE 3 showing on an enlarged scale a portion of the cutter arm assembly; and FIGURE 7 is a detail sectional view taken along line 7—7 of FIGURE 3 showing on an enlarged scale another portion of the cutter arm assembly of the machine.

Figure 1:
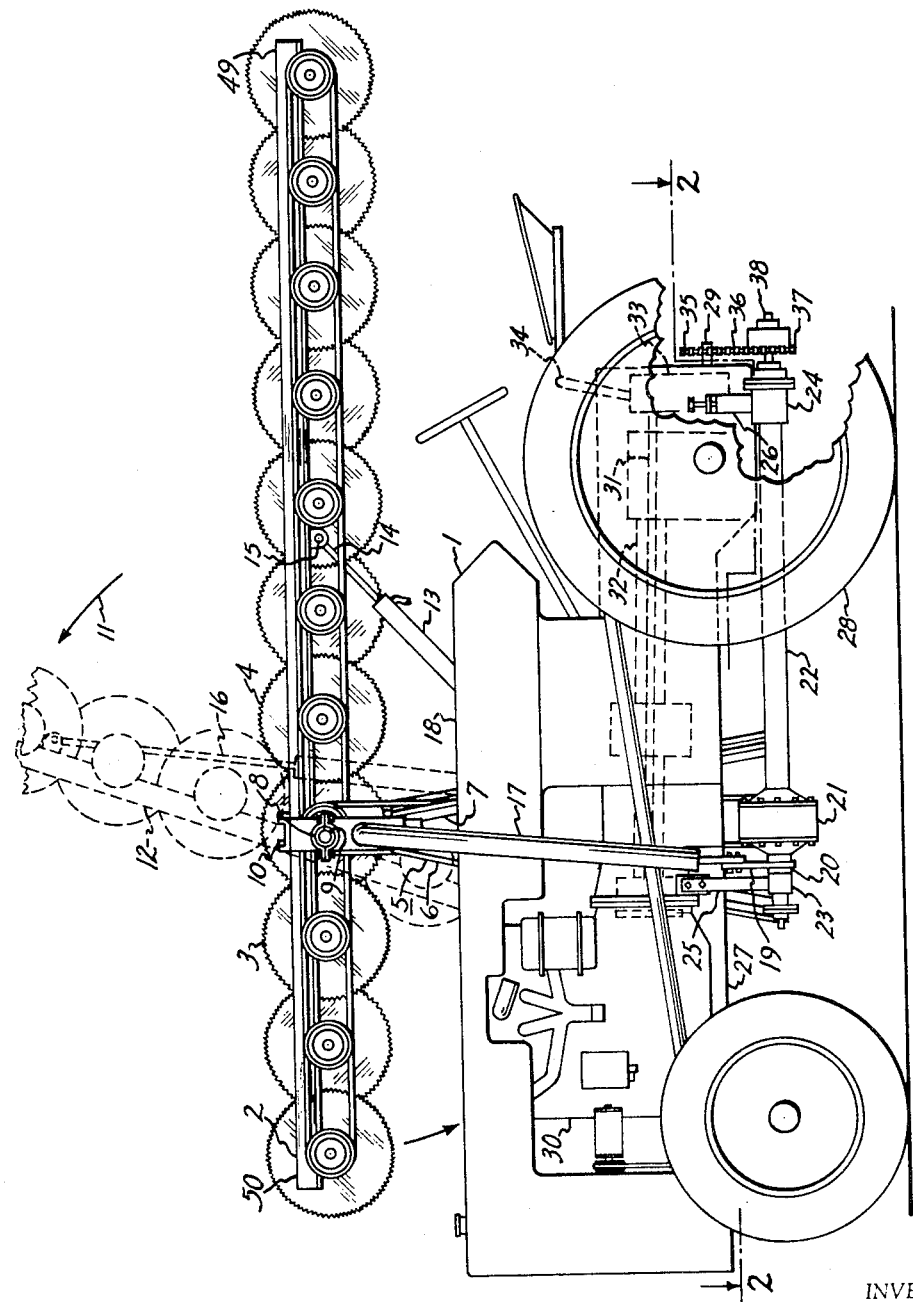
FIGURE 1 is a side elevation of a complete machine, including tractor and trimmer attachment in accord with the invention, a portion of a wheel of the tractor being broken away.

As shown in FIGURE 1, the arrangement includes a tractor 1, a cutter boom or arm 2 carrying a plurality of circular saw blades 3, 4 thereon, and a frame 5 mounting the arm 2 on the tractor. The mounting frame 5 for the arm 2 includes upright structural members 6 and 7 supporting bearings, including bearing 8 seen in FIGURE 1, and a shaft 9 supported by the bearing 8. The arm 2 includes a structural member 10 disposed generally parallel to the shaft and mounted on bearings on the shaft while being rigidly affixed to and thus integral with the arm 2. The arrangement is such that the arm may be swung from its generally horizontal inoperative or traveling position shown in solid lines in FIGURE 1 in the direction of arrow 11 about the axis of shaft 9 into the generally upright, although rearwardly inclined, normal operating position shown in broken lines at 12. Such swinging between the horizontal position and the upright position of arm 2 is controlled and accomplished by an hydraulic cylinder and piston 13 having an upper piston rod end 14 pivotally connected to the arm at 15 spaced along the arm from the axis of its pivot shaft 9. The cylinder and piston in extended condition, with the cutter arm 2 in upright operative position, are seen in broken lines at 16.

The supporting frame 5, in addition to members 6 and 7 which extend upwardly along the right hand side of the tractor, includes a curved brace member 17 which joins the members 6 and 7, extends over the top of the tractor hood 18 and thence downwardly along the left side of the tractor. The lower left hand end 19 of the brace is rigidly affixed to a shaft housing 20. The housing 20, which includes an integral gear box portion 12 and a portion 22 extending rearwardly of the gear box, is mounted by means of bearings 23 and 24, and their respective tractor-connected supports 25 and 26, in a manner to permit the housing to rotate about an axis extending longitudinally of the tractor and, as will be later explained, generally below and to the left of the tractor body 27 but inside of left rear wheel 28.

The drive for the blades 3, 4 is derived from an independent or live power takeoff 29 from engine 30, which includes a power takeoff shaft 31, shown in broken lines, and which said shaft is disposed within a hollow main propeller shaft 32 by means of which power is transmitted to the wheels, including wheel 28. Shaft 31 connects through a power takeoff clutch 33 operated by a lever 34 as further shown in broken lines. When clutch 33 is engaged or disengaged, power takeoff 29 is driven in one predetermined direction by the engine, or disengaged therefrom, respectively, without regard to whether or not the transmission and clutch for driving the wheels are in gear or engaged, and whether or not the tractor is stationary or in motion forward or reverse.

The specific connection from power takeoff 29 to the blades 3, 4 is through a sprocket 35 on the power takeoff, a chain 36, and a sprocket 37 connected by chain 36 to sprocket 35 and mounted on shaft 38. Shaft 38 extends within housing 20 into the gear box portion thereof of 21 and is gear connected in box 21 by gears not shown to a counter shaft 39, as best seen in FIGURE 2. A belt sheave 40 is mounted on counter shaft 39.

FIGURE 2 being a top plan view with the tractor 1 being shown in phantom, it will be seen that the sheave 40 is disposed to the right of the tractor. Generally surrounding the sheave 40 are elements of frame 5 including generally horizontal frame members 41, 42 which are welded to counter shaft housing portion 43 and to which upright frame members 6 and 7 are rigidly connected. Brace members 44 and 45 span between and interconnect members 41 and 42, member 44 being attached to housing portion 43 for rigidity. Member 45 mounts a bearing, shown in broken lines at 46, which provides a connection outwardly of sheave 40 between frame 5 and shaft 39. It will be understood that housing portion 43 is an integral portion of housing 20 and rigid with gear box housing portion 21 and the portion 22 which extends longitudinally of the tractor, whereby frame 5 is supported by the housing for swinging in bearings 23 and 24, about the axis of housing portion 22.

As seen in FIGURE 2, line 47 represents the axis of shaft 39 extending laterally or perpendicularly of the longitudinal axis of the tractor. The shaft 9, on which the arm 2 is carried as described in connection with other figures, extends at a slight angle with respect to the perpendicular direction represented by line 47. Specifically, the axis of shaft 9 projected into the view of FIGURE 2 is represented by line 48 which is at a horizontal angle of about 5 degrees, or between about 3 degrees and 6 degrees, from line 47, whereby shaft 9 extends slightly rearwardly in an outward direction. The result of this rearward inclination of shaft 9 is that the blades 3, 4 are inclined slightly outwardly from the tractor, having their leading edges a short distance further from the tractor center line than their trailing edges.

The angling of shaft 9 also results, when the arm 2 is in inoperative position as shown in full lines in FIGURE 1, in the rearward end 49 being closer to the tractor center line than the forward end 50. Such angling of arm 2 has not been found objectionable.

The specific arrangement of arm 2 and the blades thereon is seen from the under side in FIGURE 3. Each circular saw blade is mounted on a respective arbor and each is belt driven. In particular, blade 3 is fixed on arbor 51 which is rotatable in pillow block bearings 52 carried by arm member 53, and the arbor is driven by means of belt 54 connecting a sheave 55 fixed on arbor 51 to a sheave 56 fixed on shaft 9. Shaft 9 itself carries a blade 57 fixed directly thereto. Blade 4 is seen to be mounted on arbor 58 which is belt driven, through belt 59, from shaft 9, and the next arbor 60 is, in turn, connected for driving through belt 61 from arbor 58. Each arbor for each saw blade throughout the length of the arm is, thus, connected to drive the next adjacent arbor. It will be seen that all of the blades rotate in the same direction of rotation, and, as shown in the drawing, the blades overlap each to the next at their peripheries.

Shaft 9 is supported in bearing 8 and 62 and arm 2 is supported on shaft 9 by means of bearings 63, 64 and 65. Structural member 10, which is integral with arm 2, mounts bearing 63, while bearings 64 and 65 are attached to arm member 53. The whole cutter arm assembly 2 may, accordingly, rock about the axis of shaft 9 on bearings 63, 64, 65 while bearings 8 and 62 remain stationary, and shaft 9 is freely rotatable in all of these bearings when driven by means of multiple belt sheave 66 fixed thereon.

As seen in FIGURE 4, sheave 40 is provided with a plurality of belts 67 which connect sheaves 40 and 66 and thereby complete the driving connection from power takeoff 29 through chain 36 to longitudinal power shaft 38 and the counter shaft 39 to sheave 40, through the belts to sheave 66, and from sheave 66 to shaft 9 and thence, by belt connections on sheaves 56 and 68, progressively to each of the saw arbors mounted along the arm 2.

The supporting frame 5 for the shaft 9, and thus for the arm 2, comprises the curved brace member 17, the upright structural member 7 and frame member 41 previously described, as well as an outer upright member 69 joined at its lower end to frame member 41 and carrying a supporting bearing 70 for shaft 9 at its upper end. Suitable brace members including members 71 and 72 connect upright members 7 and 69. It will be seen that the whole frame 5 and the shaft housing 20 including gear box 21 and the countershaft housing portion 43 are pivotally supported on the tractor for pivoting about the longitudinally extending axis of shaft 38 from the upright position represented in full lines in FIGURE 4 into the outwardly inclined position represented by broken lines 73 or into the inwardly inclined position represented by broken lines 74. The frame 5 is supported in adjustable position by a hydraulic cylinder 75 and piston 76, shown in broken lines, connected between frame brace members 77 and a fixed arm 78 mounted on the tractor. The cylinder and piston, which are controlled by the operator, act between respective portions of the tractor and frame which are spaced from the axis of tilt for the frame, and it will be seen that upon hydraulic retraction of piston 76 the frame 5 swings on the axis of shaft 38, in bearings 23 and 24 is previously described, toward the position indicated at 74. With the frame in the position 74, if the arm 2 were swung into upright operative position, as shown at 12 in FIGURE 1, by means of cylinder and piston 13, the arm would extend inwardly over the tractor at its upper end 49, and, if the piston 76 is extended to position the frame as at 73, the arm 2 would then be inclined outwardly.

FIGURE 5 shows the general arrangement of portions of frame 5. The counter shaft housing portion 43, within which counter shaft 39 is disposed, is fixedly connected to brace members 41, 42 and 44 and these members, in turn, are fixed to and rigidly support upright structural members 6 and 7 and these members support bearing 8 for shaft 9. The connection between members 6 and 7 and bearing 8 includes adjustment means 79 for raising and lowering the bearing with respect to the frame 5 whereby to permit adjustment of the tension of belts 67. The support for bearing 70 toward the other end of shaft 9 will be understood to be similarly adjustable with respect to frame member 69.

FIGURE 6 shows on an enlarged scale the arrangement for mounting one of the arbor bearings, such as a bearing 52, on arm member 53. The arrangement includes an adjusting bolt 80 carried by a boss 81 fixed to the member 53. The bolt bears against the bearing 52, which is in the form of a pillow block bearing. Bolts 82 arranged in slots 83 permit, when loosened, adjustment of the position of bearing 52 along member 53, by means of bolt 80, and, when tightened, lock the bearing in the adjusted position. Such adjustment permits proper tensioning of the belts along the arm 2 which connect the arbors each to the next.

FIGURE 7 shows details of the shaft 9, supported in bearings 8 and 70, and carrying multiple sheave 66, with belts 67 engaged thereon, and arbor-driving sheaves 56 and 68 keyed to the shaft. Arm member 53 is seen to comprise a box element 84 integral with angle elements 85 and 86. The member 53 is supported on shaft 9 on bearings 63, 64 and 65, bearing 63 being mounted to structural member 10 which is joined to and extends perpendicularly from member 53. Collars, such as collar 87, are fixed to shaft 9 and disposed between bearings 64 and 65 to prevent the arm 2 from moving along the shaft.

It will be apparent that shaft 9 may rotate freely in its supporting bearings 8 and 62, and that arm 2 is supported on the rotatable shaft 9 by bearings 63, 64, 65 so as not to interfere with such rotation and so as to be swingable into erected position or, alternately, into its generally horizontal position for transportation, storage, renewal or sharpening of the saws and adjustment or replacement of belts, for example.

In operation, the tractor is driven to the groove with the cutter arm 2 horizontal and with the power takeoff clutch 33 disengaged. When the hedging operation is to commence, the arm is erected into position 12, inclined slightly rearwardly from a vertical position, by the hydraulic cylinder 13, the power takeoff clutch is engaged to drive the saws, and the tractor is driven slowly along the row of trees to be hedged. In the meantime the angle of the arm is set as desired to trim the three vertically, or slanting back from the lane or path to increase access of sunslight into the path, or slanting inwardly whereby the upper branches would overhang the path. Such adjustment is performed by cylinder and piston 75, 76, and the adjustment would be such as to compensate for any slanting of the path if the tree rows extend along a hillside.

As the tractor now proceeds along the row, because of the rearward inclination of the arm 2, upper branches which are cut by the saws fall behind rather than into the lower blades. The leading edges of the saw blades are, as explained, somewhat further from the tractor centerline than the trailing edges, whereby the branches are cut back sufficiently to minimize engagement thereof with the faces or trailing edges of the blades, providing a cleaner cut. The peripherally overlapped arrangement of the blades, such that the top of one overlaps the bottom of the next higher blade, greatly reduces the chance that any branch in the path of the arm will escape being cut.

It is important that the blades are driven from a live power takeoff independent of the main transmission and clutch of the tractor, for thus the blades can be driven at full speed while the tractor is stopped or advancing very slowly along the row. When large branches or thick foliage is encountered, the advance of the tractor can be slowed sufficiently to permit the cutting to progress slowly and while applying the full engine power to the saws. The chance of stalling the engine is, by this means, greatly reduced, yet only one engine is required to drive both the tractor and the saws.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In combination with a tractor vehicle having a power takeoff, a hedging machine for orchards, groves and the like comprising an upstanding support member disposed at one side of the tractor and having a lower end portion at approximately the level of the tractor axle and an upper end portion at approximately the level of the top of the tractor, means pivotally supportingly connecting said lower end portion to said tractor for limited swinging movement of said member about an axis generally parallel to the longitudinal axis of the tractor, extensible connecting means connected between respective points on said tractor and member spaced from said axis and operable to swing said member on said axis inclinedly toward and away from said tractor, an arm having opposed ends and an intermediate portion, a pivot element connecting said intermediate portion of said arm to said upper end portion of said member establishing for said arm a generally horizontal pivot axis extending generally transversely of the tractor, an extensible connecting device connected between respective points on said arm and said member spaced from said arm pivot axis positioning said arm with respect to said member and operable to swing said arm from a substantially horizontal position generally parallel to said tractor to an approximately vertical erected position, a plurality of circular saw blades disposed along and rotatably carried by said arm, and means connecting said power takeoff drivingly to said saw blades.

2. In combination with a tractor vehicle having a power takeoff, a generally open rectangular frame surrounding the body portion of the tractor between its axles, hinge means mounting a lower side corner portion of said frame to a lower side portion of the body of said tractor, a boom having a portion between its ends pivotally mounted to the diagonally opposite corner portion of said frame for pivoting on a generally horizontal axis extending generally transversely of said tractor, hydraulic power means connected between portions of said boom and frame which are spaced from said boom pivot axis, said power means being operable to control the pivotal position of said boom with respect to said frame, hydraulic power means connecting between respective portions of said tractor body and said frame spaced from said hinge axis operable to control the pivotal position of said frame on said hinge axis with respect to said tractor body whereby to incline said pivot axis and to incline said boom laterally toward or away from said tractor when said boom is in upright erected position, a plurality of circular saws disposed along said boom, and means drivingly connecting said saws to the power takeoff of said tractor.

3. In combination with a tractor vehicle having a rear live power takeoff, a generally open rectangular frame surrounding the body portion of the tractor between its axles, hinge means mounting a lower side corner portion of said frame to a lower side portion of the body of said tractor, a boom having a portion between its ends pivotally mounted to the diagonally opposite corner portion of said frame for pivoting on a generally horizontal axis extending generally transversely of said tractor, hydraulic power means connected between portions of said boom and frame which are spaced from said boom pivot axis, said power means being operable to control the pivotal position of said boom with respect to said frame, hydraulic power means connecting between respective portions of said tractor body and said frame spaced from said hinge axis operable to control the pivotal position of said frame on said hinge axis with respect to said tractor body whereby to incline said pivot axis and to incline said boom laterally toward or away from said tractor when said boom is in an upright erected position, a plurality of circular saws disposed along said boom, a shaft disposed longitudinally along said tractor having a rear end and a forward end, means connecting said rearward end of said shaft to said power takeoff, a counter shaft connected to and extending from adjacent said forward end of said longitudinal shaft in a direction parallel to said pivot axis, and belt means connecting between said counter shaft and said saws for driving said saws from said power takeoff.

4. In combination with a tractor having a rear power takeoff, a hedging boom comprising a rigid beam, a shaft extending generally horizontally and transversely of the tractor, a bearing disposed to one side of and generally above the body of said tractor and rotatively mounting said shaft, two frame elements mounting said bearing, one said element being disposed to said one side of the body of said tractor and having an upper end connected to said bearing and a lower end located adjacent the bottom of the tractor body, the other said element having an upper end connected to said bearing and extending from its said upper end laterally over and across the tractor body and thence downwardly along the other side of the tractor body and having a lower end located adjacent the bottom of the tractor, a rigid frame member extending laterally under said tractor body and extending between and rigidly joined to said lower ends of said frame elements, hinge means connecting said frame member to said tractor body and being disposed adjacent to said other side and to said bottom of said tractor body, said hinge means establishing an axis longitudinally of said tractor for pivoting of said frame member and elements with respect to said tractor body, a second shaft spaced below and disposed parallel to said first shaft and having one end adjacent said axis of said hinge means and a second end disposed adjacent said lower end of said one frame element, bearing means supportingly connecting said second shaft to said frame member, means drivingly connecting the power takeoff of the tractor to said one end of said second shaft, pulleys on said first shaft and on said other end of said second shaft, belt means connecting said pulleys, said first shaft having an outer end spaced outwardly of the pulley thereon, a saw blade connected to said outer end, a beam having a bearing spaced between its ends, said bearing being disposed on said first shaft between said pulley and said saw blade and mounting said beam transversely and swingably on said first shaft, a plurality of circular saw blades disposed along said beam, shaft means mounting said saw blades, bearing means on said beam mounting said saw blade shafts, flexible drive means coupling said mounting shaft to said saw blade shafts for driving said other saw blades, extensible means connecting respective portions of said beam and of said one frame element spaced from said mounting shaft for controlling the position of said beam, and extensible means connecting respective portions of said frame member and of the tractor body spaced from said axis for controlling the position of said frame elements and said first shaft.

5. In combination, a wheeled, self-powered tractor vehicle having a live power takeoff, a clutch for connecting the tractor engine to its drive wheels, a second clutch for connecting the tractor engine to said power takeoff, an upstanding support member mounted to the tractor and having an upper end generally above and to one side of the tractor body, an elongated boom having an intermediate portion spaced between its ends, a first circular saw blade at said intermediate portion, bearing and journal means having a rotational axis oriented substantially horizontally and laterally of the vehicle connecting said boom at its said intermediate portion to said upper end of said support member for swinging of said boom on said axis, said means including a shaft attached to said blade and rotatable on said axis, means connecting said shaft to said power takeoff for driving said shaft and blade, a plurality of other circular saw blades mounted along said boom outwardly from said first blade toward each end of the boom, means extending along said boom drivingly connecting said other blades to said shaft, and means to swing said boom on said axis between generally upright operative position and generally horizontal position and for selectively retaining said boom in said positions.

References Cited in the file of this patent
UNITED STATES PATENTS

| | | |
|---|---|---|
| 2,926,480 | Kimball | Mar. 1, 1960 |
| 2,940,486 | Whitmore | June 14, 1960 |
| 2,997,835 | Stewart | Aug. 29, 1961 |
| 3,023,561 | Gustafson | Mar. 6, 1962 |